United States Patent
Kim et al.

(10) Patent No.: US 8,836,613 B2
(45) Date of Patent: *Sep. 16, 2014

(54) STEREOSCOPIC IMAGE DISPLAY FOR IMPROVING LUMINANCE OF 2D IMAGE AND VERTICAL VIEWING ANGLE OF 3D IMAGE

(75) Inventors: Seok Kim, Gyeonggi-do (KR);
Kwangjo Hwang, Gyeonggi-do (KR);
Euitae Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 126 days.

This patent is subject to a terminal disclaimer.

(21) Appl. No.: 13/609,545

(22) Filed: Sep. 11, 2012

(65) Prior Publication Data
US 2013/0088481 A1    Apr. 11, 2013

(30) Foreign Application Priority Data
Oct. 6, 2011  (KR) .......................... 10-2011-0102070

(51) Int. Cl.
| | |
|---|---|
| G09G 5/00 | (2006.01) |
| H04N 13/04 | (2006.01) |
| G02B 27/26 | (2006.01) |
| G09G 3/00 | (2006.01) |
| G09G 3/36 | (2006.01) |
| G02F 1/1362 | (2006.01) |

(52) U.S. Cl.
CPC ............ *G02B 27/26* (2013.01); *H04N 13/0497* (2013.01); *H04N 13/0434* (2013.01); *H04N 13/0452* (2013.01); *G09G 3/003* (2013.01); *G09G 3/36* (2013.01); *G02F 1/136286* (2013.01)
USPC .................................................. 345/4; 345/6

(58) Field of Classification Search
CPC ..... G02B 27/00; G02B 27/22; G02B 27/2207
USPC ................ 345/1.1–9, 32; 349/15; 348/42–48; 353/7
See application file for complete search history.

(56) References Cited

U.S. PATENT DOCUMENTS

| | | | |
|---|---|---|---|
| 2001/0005252 A1 | 6/2001 | Lee et al. | |
| 2010/0265230 A1 | 10/2010 | Kang | |
| 2011/0227886 A1* | 9/2011 | Lee et al. | ....................... 345/204 |

FOREIGN PATENT DOCUMENTS

| | | |
|---|---|---|
| JP | 7-36058 | 2/1995 |
| JP | 2001-222030 | 8/2001 |

(Continued)

OTHER PUBLICATIONS

Japanese Office Action for Japanese Application No. 2012-196477 dated Sep. 3, 2013.

*Primary Examiner* — Chanh Nguyen
*Assistant Examiner* — Ram Mistry
(74) *Attorney, Agent, or Firm* — Morgan, Lewis & Bockius LLP

(57) ABSTRACT

A stereoscopic image display includes a display panel including pixels and a patterned retarder. Each pixel includes a main display unit including a first pixel electrode connected to a data line through a first thin film transistor (TFT) and a first common electrode connected to an upper common line, an auxiliary display unit including a second pixel electrode, which is connected to the data line through a second TFT and is connected to the upper common line through a discharge control TFT, and a second common electrode connected to the upper common line, and a line unit between the main display unit and the auxiliary display unit. The line unit includes a gate line, through which a scan pulse is applied to the first and second TFTs, and a discharge control line, through which a discharge control voltage is applied to the discharge control TFT.

5 Claims, 10 Drawing Sheets

(56) References Cited

FOREIGN PATENT DOCUMENTS

| | | |
|---|---|---|
| JP | 2002-185983 | 6/2002 |
| JP | 2010-250257 | 11/2010 |
| KR | 10-2010-0115036 | 10/2010 |

* cited by examiner (A) 2D MODE (B) 3D MODE (A) 2D MODE    (B) 3D MODE

STEREOSCOPIC IMAGE DISPLAY FOR IMPROVING LUMINANCE OF 2D IMAGE AND VERTICAL VIEWING ANGLE OF 3D IMAGE

This application claims the benefit of Korean Patent Application No. 10-2011-0102070 filed on Oct. 6, 2011, which is incorporated herein by reference for all purposes as if fully set forth herein.

BACKGROUND OF THE INVENTION

1. Field of the Invention

Embodiments of the invention relate to a stereoscopic image display capable of selectively implementing a two-dimensional plane image (hereinafter referred to as '2D image') and a three-dimensional stereoscopic image (hereinafter referred to as '3D image').

2. Discussion of the Related Art

A stereoscopic image display capable of selectively implementing a 2D image and a 3D image has been developed and has been put on the market due to the development of various contents and circuit technology. A method for implementing the 3D image of the stereoscopic image display is mainly classified into a stereoscopic technique and an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarized glasses or liquid crystal (LC) shutter glasses.

A LC shutter glasses type stereoscopic image display alternately displays a left eye image and a right eye image on a display element every one frame and opens and closes a left eye shutter and a right eye shutter of LC shutter glasses in synchronization with a display timing, thereby implementing the 3D image. In the LC shutter glasses type stereoscopic image display, because the LC shutter glasses have a short data-on time, a luminance of the 3D image is low. Further, a 3D crosstalk is extremely generated because of the synchronization between the display element and the LC shutter glasses and the On/Off conversion response characteristic.

In a polarized glasses type stereoscopic image display, a polarization separation device, such as a patterned retarder, is attached to a display panel. The patterned retarder separates polarized light of a left eye image and a right eye image displayed on the display panel. A viewer wears polarized glasses when viewing a stereoscopic image on the polarized glasses type stereoscopic image display. Hence, the viewer sees polarized light of the left eye image through a left eye filter of the polarized glasses and polarized light of the right eye image through a right eye filter of the polarized glasses, thereby giving a stereoscopic feeling.

The display panel of the existing polarized glasses type stereoscopic image display may use a liquid crystal display panel. A parallax is generated between a pixel array of the liquid crystal display panel and the patterned retarder due to a thickness of an upper glass substrate of the liquid crystal display panel and a thickness of an upper polarizing plate, and thus leads to a poor vertical viewing angle. When the viewer views a stereoscopic image displayed on the polarized glasses type stereoscopic image display at a vertical viewing angle higher or lower than the front of the liquid crystal display panel, he or she may feel the 3D crosstalk, where the left eye image and the right eye image overlap each other, when viewing the stereoscopic image with a single eye (i.e., the left eye or the right eye).

To solve the problem of the 3D crosstalk at the vertical viewing angle in the polarized glasses type stereoscopic image display, Japanese Laid Open Publication No. 2002-185983 proposed a method for forming black stripes on a patterned retarder (or 3D film) of a stereoscopic image display. In a method different from this method, the width of black matrices formed on a liquid crystal display panel can be increased. However, the formation of the black stripes on the patterned retarder may result in a reduction in luminance of 2D and 3D images, and the black matrices may interact with the black stripes, thereby generating moiré. Further, an increase in the width of the black matrices may reduce an aperture ratio, thereby reducing the luminance of the 2D and 3D images.

To solve the problem of the polarized glasses type stereoscopic image display disclosed in Japanese Laid Open Publication No. 2002-185983, a technology for dividing each of pixels of a display panel into two parts and controlling one of the two parts using an active black stripe was disclosed in Korean Patent Application No. 10-2009-0033534 (filed on Apr. 17, 2009) and U.S. application Ser. No. 12/536,031 (filed on Aug. 5, 2009) corresponding to the present applicant, and which are hereby incorporated by reference in their entirety. The stereoscopic image display proposed by the present applicant divides each of the pixels into the two parts and writes 2D image data to each of the divided pixels in a 2D mode to thereby prevent a reduction in a luminance of a 2D image, and also displays a 3D image on the divided one part of each pixel and displays a black image on the other part in a 3D mode to thereby widen a vertical viewing angle of the 3D image. However, in the active black stripe technology, the number of gate lines was doubled because of the division of each pixel into the two parts, and thus configuration of a gate driver became complicated.

SUMMARY OF THE INVENTION

Embodiments of the invention provide a stereoscopic image display capable of improving a luminance of a 2D image and a vertical viewing angle of a 3D image without an increase in the number of gate lines.

In one aspect, there is a stereoscopic image display including a display panel configured to selectively display a 2D image and a 3D image, the display panel including a plurality of pixels, and a patterned retarder configured to divide light from the display panel into first polarized light and second polarized light, wherein each of the plurality of pixels includes a main display unit including a first pixel electrode connected to a data line through a first thin film transistor (TFT) and a first common electrode which is opposite to the first pixel electrode and is connected to an upper common line, an auxiliary display unit including a second pixel electrode, which is connected to the data line through a second TFT and is connected to the upper common line through a discharge control TFT, and a second common electrode which is opposite to the second pixel electrode and is connected to the upper common line, and a line unit disposed between the main display unit and the auxiliary display unit, the line unit including a gate line, through which a scan pulse is commonly applied to the first TFT and the second TFT, and a discharge control line, through which a discharge control voltage is applied to the discharge control TFT, wherein a lower common line, through which a common voltage is applied to the upper common line, is formed to the outside of the main display unit and the auxiliary display unit.

The lower common line includes a first lower common line which is opened toward the line unit while surrounding the outside of the main display unit, and a second lower common line which is opened toward the line unit while surrounding the outside of the auxiliary display unit.

The first TFT and the second TFT are formed on the gate line. A first storage capacitor of the main display unit, a second storage capacitor of the auxiliary display unit, and the discharge control TFT are formed on the discharge control line.

The first storage capacitor is formed by a drain electrode of the first TFT and the discharge control line, which overlap each other with a gate insulating layer interposed therebetween. The second storage capacitor is formed by a drain electrode of the second TFT and the discharge control line, which overlap each other with the gate insulating layer interposed therebetween.

When the 2D image is implemented, the discharge control voltage of the same level as a gate low voltage of the scan pulse is commonly applied to the discharge control TFTs of the plurality of pixels. When the 3D image is implemented, the discharge control voltage of a slight-on level, which is higher than the gate low voltage and is lower than a gate high voltage of the scan pulse, is commonly applied to the discharge control TFTs of the plurality of pixels.

The gate line and the discharge control line of the line unit are formed on the same level layer as the lower common line and cross between the main display unit and the auxiliary display unit to be positioned parallel to each other.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 1 to 10.

Figure 1:
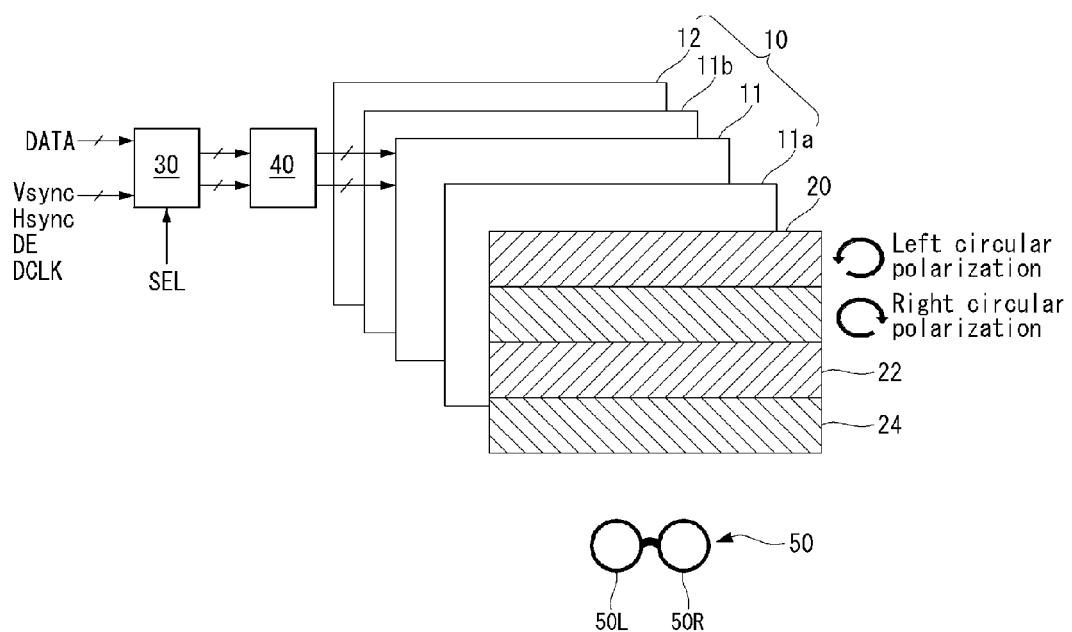
FIGS. 1 and 2 illustrate a polarized glasses type stereoscopic image display according to an example embodiment of the invention.
Figure 2:
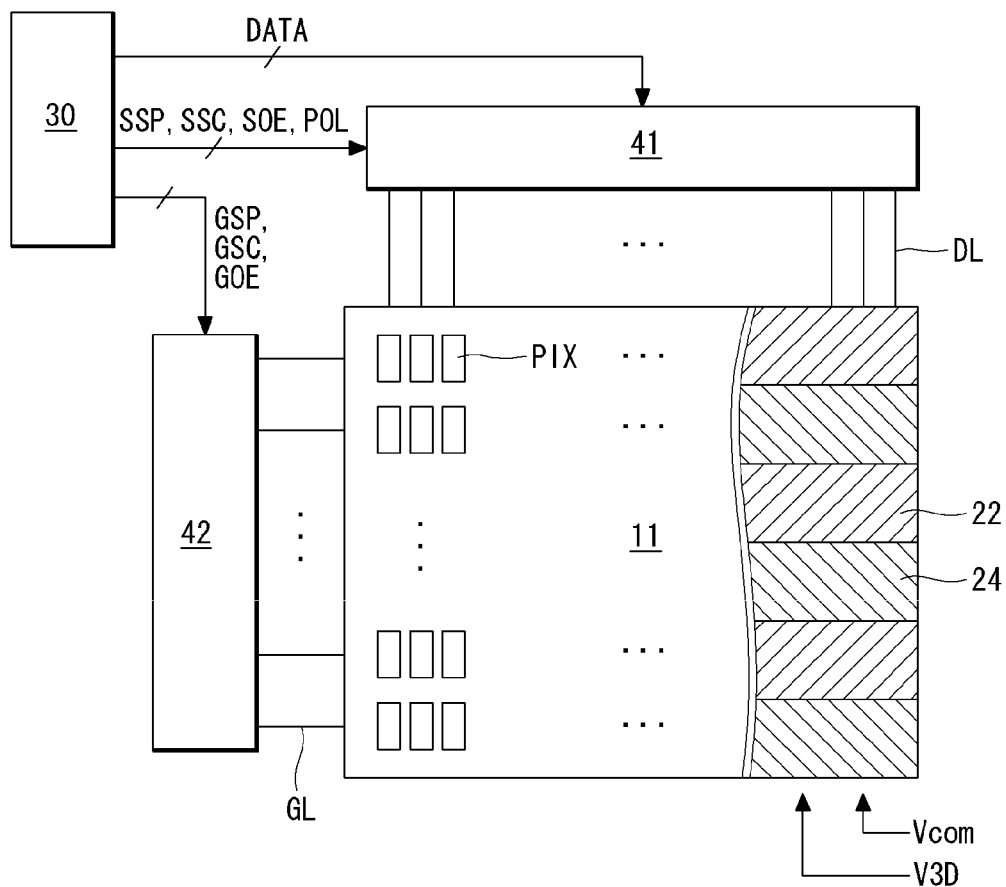
Figure 3:
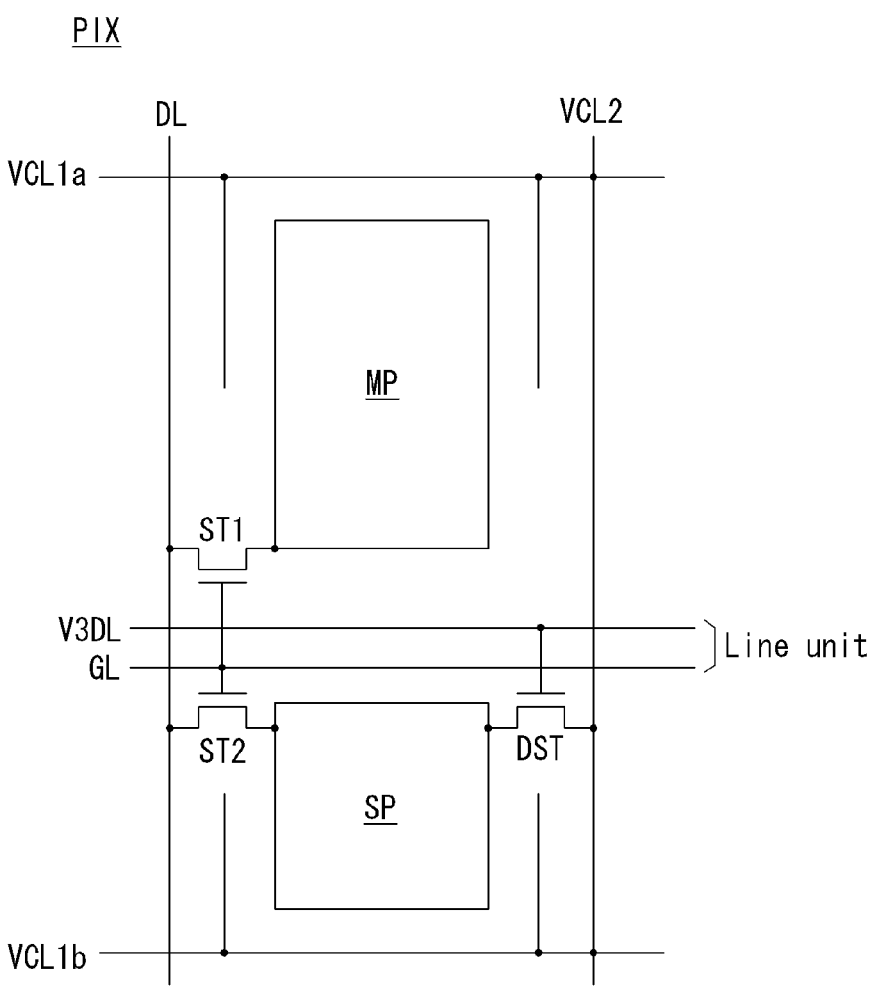
FIG. 3 schematically illustrates one of a plurality of pixels shown in FIG. 2.
Figure 4:
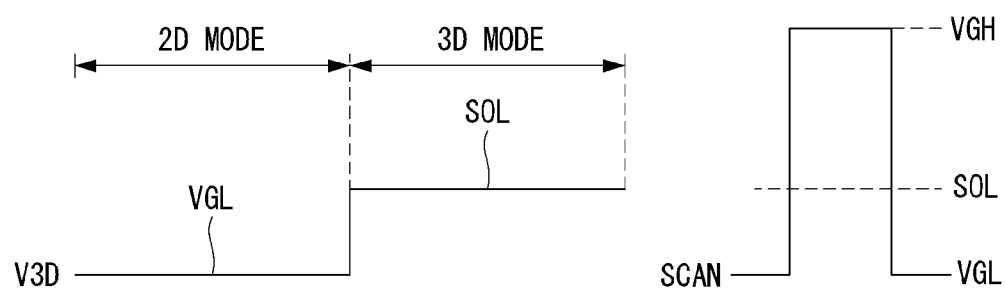
FIG. 4 illustrates a generation level of a discharge control voltage depending on a driving mode.

FIGS. 1 and 2 illustrate a polarized glasses type stereoscopic image display according to an example embodiment of the invention. FIG. 3 schematically illustrates one of a plurality of pixels shown in FIG. 2. FIG. 4 illustrates a generation level of a discharge control voltage depending on a driving mode.

As shown in FIGS. 1 to 4, the stereoscopic image display according to the embodiment of the invention includes a display element 10, a patterned retarder 20, a controller 30, a panel driving circuit 40, and polarized glasses 50.

The display element 10 may be implemented as a flat panel display, such as a liquid crystal display (LCD), a field emission display (FED), a plasma display panel (PDP) display, an electroluminescence device (EL) including an inorganic electroluminescence element and an organic light emitting diode (OLED), and an electrophoretic display (EPD). In the following description, the stereoscopic image display according to the embodiment of the invention is described using the liquid crystal display as the display element 10.

The display element 10 includes a display panel 11, an upper polarizing film 11a, and a lower polarizing film 11b.

The display panel 11 displays a 2D image in a 2D mode, and displays a 3D image in a 3D mode. The display panel 11 includes an upper glass substrate, a lower glass substrate, and a liquid crystal layer between the upper and lower glass substrates. A plurality of data lines DL, a plurality of gate lines GL crossing the data lines DL, lower common lines VCL1a and VCL1b and an upper common line VCL2 which are electrically connected to each other and are supplied with a common voltage Vcom, a discharge control line V3DL to which a discharge control voltage V3D is supplied, etc. are formed on the lower glass substrate of the display panel 11. Black matrixes and color filters are formed on the upper glass substrate of the display panel 11.

The upper polarizing film 11a is attached to the upper glass substrate of the display panel 11, and the lower polarizing film 11b is attached to the lower glass substrate of the display panel 11. Alignment layers for setting a pre-tilt angle of liquid crystals are respectively formed on the upper and lower glass substrates of the display panel 11. In a vertical electric field driving manner such as a twisted nematic (TN) mode and a vertical alignment (VA) mode, common electrodes, to which the common voltage Vcom is supplied, may be formed on the upper glass substrate. In a horizontal electric field driving manner such as an in-plane switching (IPS) mode and a fringe field switching (FFS) mode, the common electrodes may be formed on the lower glass substrate along with pixel electrodes. A column spacer may be formed between the upper and lower glass substrates to keep cell gaps of the liquid crystal cells of the display panel 11 constant.

The display element 10 according to the embodiment of the invention may be implemented as any type liquid crystal display including a transmissive liquid crystal display, a transflective liquid crystal display, and a reflective liquid crystal display. A backlight unit 12 is necessary in the transmissive liquid crystal display and the transflective liquid crystal display. The backlight unit 12 may be implemented as a direct type backlight unit or an edge type backlight unit.

A plurality of unit pixels are disposed on the display panel 11 in a matrix form based on a crossing structure between the data lines DL and the gate lines GL, thereby constituting a pixel array. Each of the unit pixels includes three pixels PIX for respectively displaying red, green, and blue images. As shown in FIG. 3, each pixel PIX includes a main display unit MP and an auxiliary display unit SP functioning as an active black stripe with a line unit interposed therebetween. Namely, the main display unit MP and the auxiliary display unit SP of each pixel PIX are positioned on opposite sides of the line unit. The gate line GL and the discharge control line V3DL included in the line unit of each pixel cross between the main display unit MP and the auxiliary display unit SP to be positioned parallel to each other. The first lower common line VCL1a is opened toward the line unit while surrounding the outside of the main display unit MP. The second lower common line VCL1b is opened toward the line unit while surrounding the outside of the auxiliary display unit SP.

The main display unit MP is connected to the data line DL through a first thin film transistor (TFT) ST1. The auxiliary display unit SP is connected to the data line DL through a second TFT ST2 and is connected to the upper common line VCL2 through a discharge control TFT DST. The first TFT ST1 and the second TFT ST2 are simultaneously turned on or off in response to a scan pulse SCAN (shown in FIG. 4) from the gate line GL. The scan pulse SCAN swings between a gate low voltage VGL and a gate high voltage VGH. The discharge control TFT DST is turned on or off in response to the discharge control voltage V3D supplied through the discharge control line V3DL.

As shown in FIG. 4, the discharge control voltage V3D is generated at different levels in response to a mode selection signal SEL. More specifically, in the 2D mode, the discharge control voltage V3D may be generated at the same voltage level as the gate low voltage VGL capable of turning off the discharge control TFT DST. In the 3D mode, the discharge control voltage V3D may be generated at a slight-on level SOL, which is higher than the gate low voltage VGL and is lower than the gate high voltage VGH, so that it can slight-on the discharge control TFT DST. A channel resistance of the TFT in a slight-on state is greater than a channel resistance of the TFT in a full-on state. Namely, an amount of current flowing between a source electrode and a drain electrode of the TFT in the slight-on state is less than an amount of current flowing between the source electrode and the drain electrode of the TFT in the full-on state. In the 3D mode, the discharge control voltage V3D may be periodically reduced to the level of the gate low voltage VGL, so as to reduce the degradation of the discharge control TFT DST. This is disclosed in detail in Korean Patent Application Nos. 10-2011-0070327 (filed on Jul. 15, 2011) and 10-2011-0090874 (filed on Sep. 7, 2011) corresponding to the present applicant, and which are hereby incorporated by reference in their entirety. When the gate low voltage VGL is about −5V to 0V and the gate high voltage VGH is about 25V to 30V, a voltage of the slight-on level SOL may be about 8V to 12V.

The main display unit MP displays video data of the 2D image in the 2D mode and displays video data of the 3D image in the 3D mode. The auxiliary display unit SP displays the video data of the 2D image in the 2D mode, but represents a black gray level in the 3D mode to thereby serve as the active black stripe. The auxiliary display unit SP increases an aperture ratio and a luminance of the 2D image in the 2D mode and increases a vertical viewing angle of the 3D image in the 3D mode. The sizes and the shapes of the main display unit MP and the auxiliary display unit SP of one pixel PIX may be properly designed in consideration of driving characteristics of the display panel, a luminance of a display image, a vertical viewing angle of the 3D image, characteristics of applied product, etc.

The patterned retarder 20 is attached to the upper polarizing film 11a of the display panel 11. A first pattern 22 is formed on each of odd-numbered lines of the patterned retarder 20, and a second pattern 24 is formed on each of even-numbered lines of the patterned retarder 20. A light absorption axis of the first pattern 22 is different from a light absorption axis of the second pattern 24. The first patterns 22 are opposite to odd-numbered horizontal pixel lines of the pixel array, and the second patterns 24 are opposite to even-numbered horizontal pixel lines of the pixel array. The first pattern 22 retards a phase of linearly polarized light incident through the upper polarizing film 11a by quarter wavelength and transmits it as first polarized light (for example, left-circularly polarized light). The second pattern 24 retards a phase of linearly polarized light incident through the upper polarizing film 11a by three-quarter wavelength and transmits it as second polarized light (for example, right-circularly polarized light).

The controller 30 controls an operation of the panel driving circuit 40 in conformity with the 2D mode or the 3D mode in response to a mode selection signal SEL. The controller 30 receives the mode selection signal SEL through a user interface, such as a touch screen, an on-screen display (OSD), a keyboard, a mouse, and a remote controller. The controller 30 may switch between an operation of the 2D mode and an operation of the 3D mode in response to the mode selection signal SEL. The controller 30 detects a 2D/3D identification code encoded to data of an input image, for example, a 2D/3D identification code capable of being coded to an electronic program guide (EPG) or an electronic service guide (ESG) of a digital broadcasting standard, thereby distinguishing between the 2D mode and the 3D mode.

In the 3D mode, the controller 30 divides the video data of the 3D image received from a video source into RGB data of a left eye image and RGB data of a right eye image and then supplies the RGB data of the left eye image and the RGB data of the right eye image to a data driver 41 of the panel driving circuit 40. For this, the controller 30 may include a 3D formatter (not shown). In the 2D mode, the controller 30 supplies RGB data of a 2D image received from the video source to the data driver 41. The controller 30 may include a 3D board (not shown) for generating the discharge control voltage V3D.

The controller 30 generates control signals for controlling operation timing of the panel driving circuit 40 using timing signals such as a vertical sync signal Vsync, a horizontal sync signal Hsync, a data enable DE, and a dot clock DCLK.

A data control signal for controlling operation timing of the data driver 41 of the panel driving circuit 40 includes a source start pulse SSP, a source sampling clock SSC, a source output enable SOE, a polarity control signal POL, and the like. The source start pulse SSP indicates a supply start time of data corresponding to one horizontal line in one horizontal period during which the data corresponding to the one horizontal line is displayed. The source sampling clock SSC controls a latch operation of data based on a rising or falling edge thereof. The source output enable SOE controls an output of the data driver 41. The polarity control signal POL controls a polarity of a data voltage to be supplied to the liquid crystal cells of the display panel 11.

A gate control signal for controlling operation timing of a gate driver 42 of the panel driving circuit 40 includes a gate start pulse GSP, a gate shift clock GSC, a gate output enable GOE, and the like. The gate start pulse GSP indicates a start horizontal line of a scan operation in one vertical period during which one screen is displayed. The gate shift clock GSC is input to a shift register inside the gate driver 42 and sequentially shifts the gate start pulse GSP. The gate output enable GOE controls an output of the gate driver 42.

The controller 30 multiplies the frequency of the timing signals Vsync, Hsync, DE, and DCLK synchronized with an input frame frequency by N to obtain a frame frequency of (f×N) Hz, where N is a positive integer equal to or greater than 2, and f is the input frame frequency. Hence, the controller 30 may control the operation of the panel driving circuit 40 based on the frame frequency of (f×N) Hz. The input frame frequency is 50 Hz in a phase alternate line (PAL) scheme and 60 Hz in a national television standards committee (NTSC) scheme.

The panel driving circuit 40 includes the data driver 41 for driving the data lines DL of the display panel 11 and the gate driver 42 for driving the gate lines GL of the display panel 11.

The data driver 41 includes a plurality of driving integrated circuits (ICs). Each of the plurality of driving ICs includes a shift register, a latch, a digital-to-analog converter (DAC), an output buffer, etc. The data driver 41 latches the RGB data of the 2D or 3D image in response to the data control signals SSP, SSC, and SOE. The data driver 41 converts the RGB data of the 2D or 3D image into analog positive and negative gamma compensation voltages in response to the polarity control signal POL and inverts a polarity of the data voltage. The data driver 41 outputs the data voltage to the data lines DL, so that the data voltage is synchronized with a scan pulse (or a gate pulse) output from the gate driver 42. The driving ICs of the data driver 41 may be bonded to the lower glass substrate of the display panel 11 through a tape automated bonding (TAB) process.

The gate driver 42 generates the scan pulse, which swings between the gate high voltage VGH and the gate low voltage VGL, in response to the gate control signals GSP, GSC, and GOE. The gate driver 42 supplies the scan pulse to the gate lines GL in a line sequential manner in response to the gate control signals GSP, GSC, and GOE. The gate driver 42 includes a gate shift register array, etc. The gate shift register array of the gate driver 42 may be formed in a non-display area outside a display area of the display panel 11, in which the pixel array is formed, in a gate driver-in-panel (GIP) manner. A plurality of gate shift registers included in the gate shift register array may be formed with along the pixel array in a TFT process of the pixel array in the GIP manner. The gate shift register array of the gate driver 42 may be implemented as a plurality of driving ICs bonded to the lower glass substrate of the display panel 11 through the TAB process.

The polarized glasses 50 include a left eyeglass 50L having a left eye polarizing filter and a right eyeglass 50R having a right eye polarizing filter. The left eye polarizing filter has the same light absorption axis as the first pattern 22 of the patterned retarder 20, and the right eye polarizing filter has the same light absorption axis as the second pattern 24 of the patterned retarder 20. For example, a left circular polarizing filter may be selected as the left eye polarizing filter of the polarized glasses 50, and a right circular polarizing filter may be selected as the right eye polarizing filter of the polarized glasses 50. When a viewer wears the polarized glasses 50, he or she views only the left eye image through his or her left eye and views only the right eye image through his/her right eye. As a result, he/she may feel a stereoscopic feeling through a binocular disparity.

Figure 5:
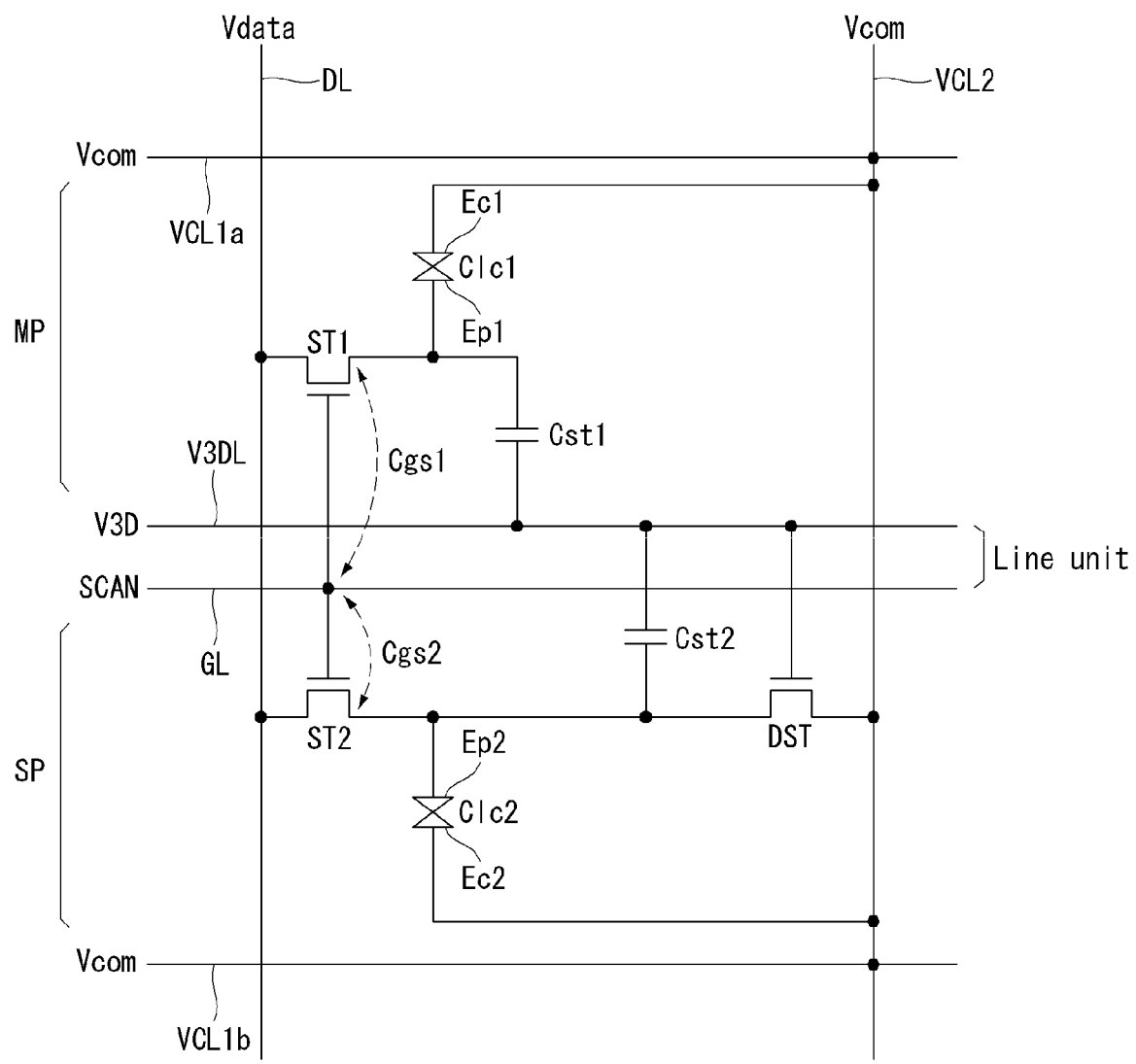
FIG. 5 is an equivalent circuit diagram of a pixel according to an example embodiment of the invention.
Figure 6:
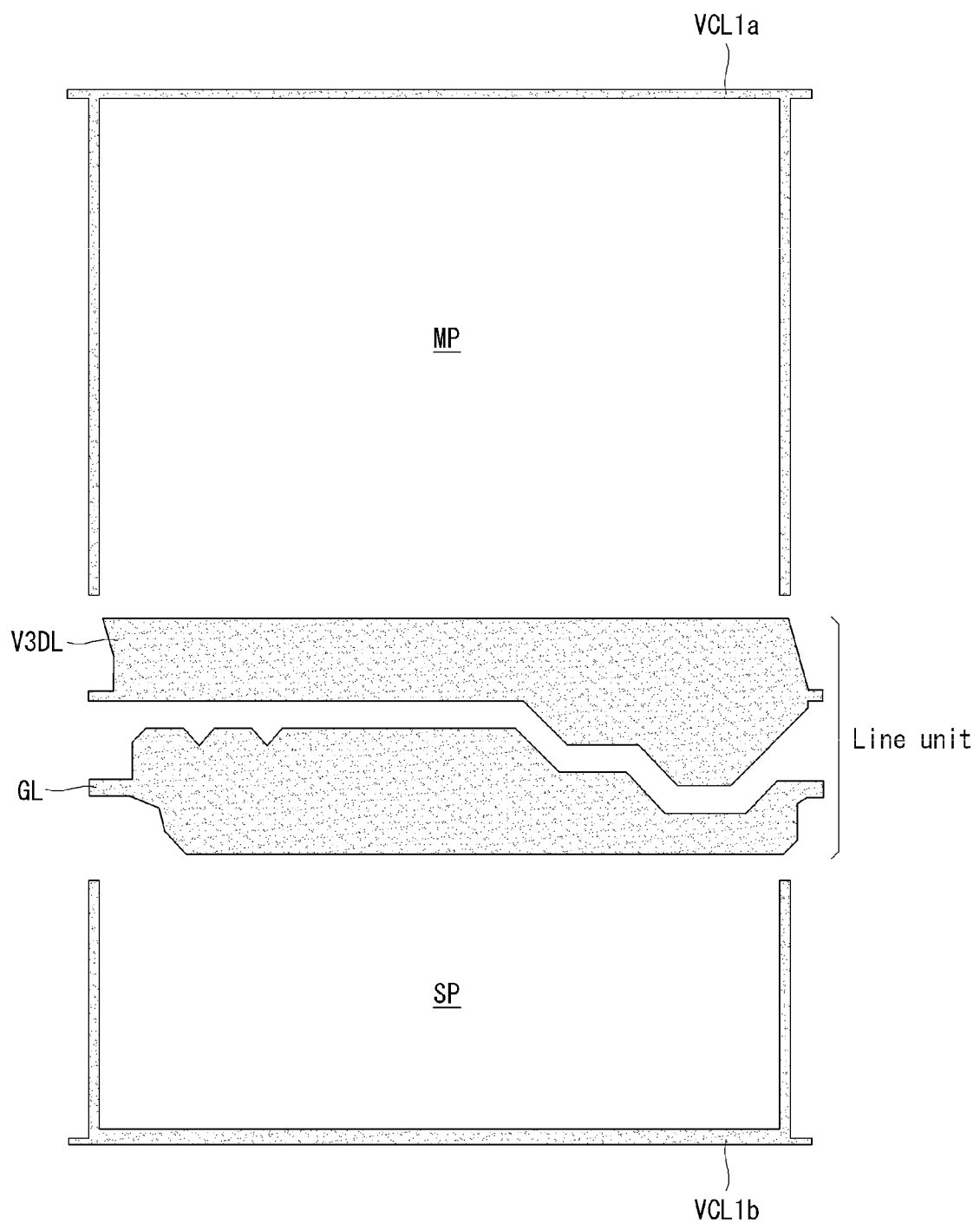
FIG. 6 illustrates a gate line and a discharge control line of a line unit and a lower common line formed outside a pixel.
Figure 7:
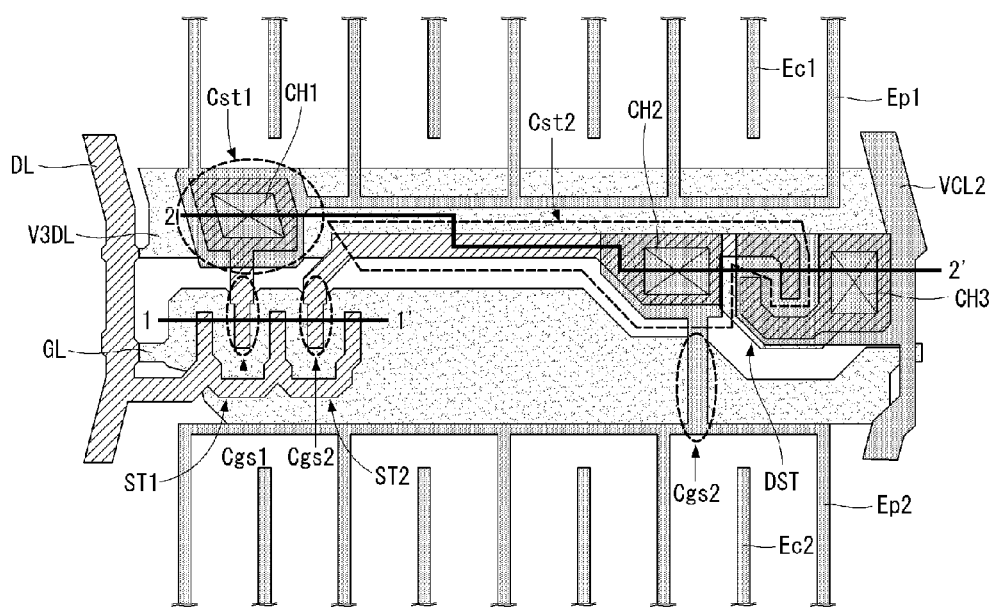
FIG. 7 illustrates in detail a line unit of a pixel having a circuit configuration shown in FIG. 5.
Figure 8A:
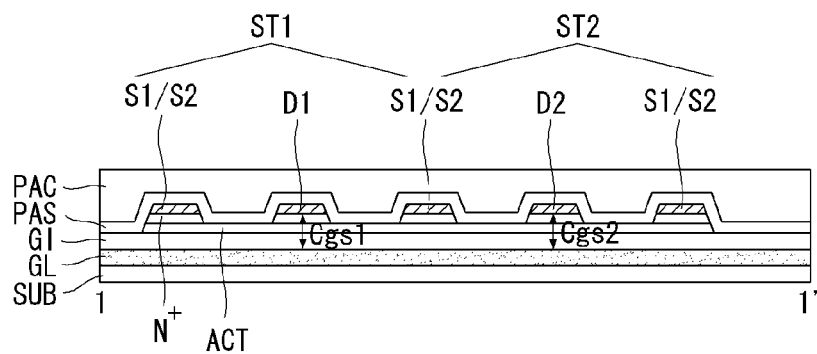
FIG. 8A is a cross-sectional view taken along line 1-1' of FIG. 7.
Figure 8B:
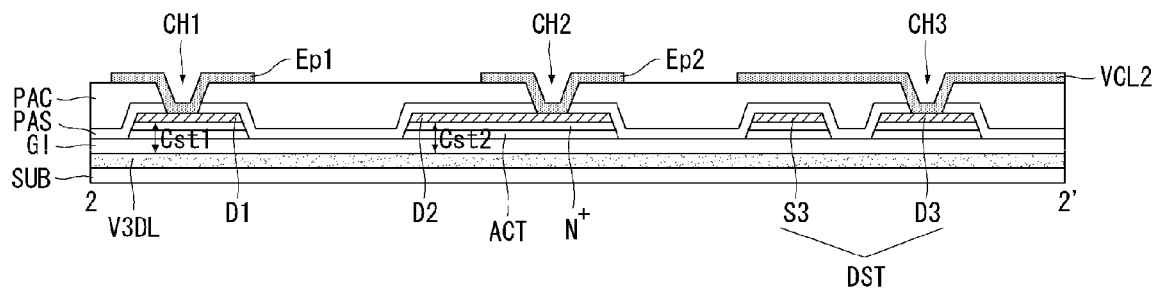
FIG. 8B is a cross-sectional view taken along line 2-2' of FIG. 7.

FIG. 5 is an equivalent circuit diagram of a pixel according to the embodiment of the invention. FIG. 6 illustrates a gate line and a discharge control line of a line unit and a lower common line formed outside a pixel. FIG. 7 is a plane view illustrating in detail a line unit of a pixel having a circuit configuration shown in FIG. 5. FIG. 8A is a cross-sectional view taken along line 1-1' of FIG. 7. FIG. 8B is a cross-sectional view taken along line 2-2' of FIG. 7. In FIGS. 8A and 8B, 'ACT' denotes an active layer for forming a channel between a source electrode and a drain electrode of a TFT, 'N+' denotes an ohmic contact layer for ohmic contact between the source electrode and the drain electrode of the TFT, and 'SUB' denotes the lower glass substrate.

As shown in FIGS. 6 to 8B, a pixel includes a main display unit MP and an auxiliary display unit SP on the opposite sides of a line unit with the line unit interposed therebetween.

The main display unit MP includes a first pixel electrode Ep1 and a first common electrode Ec1 which are positioned opposite each other and form a first liquid crystal (LC) capacitor Clc1. The first pixel electrode Ep1 is connected to the data line DL through a first TFT ST1. The first TFT ST1 is turned on in response to the scan pulse SCAN from the gate line GL, and thus a data voltage Vdata on the data line DL is applied to the first pixel electrode Ep1. A gate electrode of the first TFT ST1 is connected to the gate line GL, and a source electrode S1 of the first TFT ST1 is connected to the data line DL. A drain electrode D1 of the first TFT ST1 is connected to the first pixel electrode Ep1 through a first contact hole CH1 passing through an organic insulating layer PAC and an inorganic insulating layer PAS. The drain electrode D1 of the first TFT ST1 overlaps the discharge control line V3DL with a gate insulating layer GI interposed therebetween to form a first storage capacitor Cst1. The first storage capacitor Cst1 uniformly holds a charge voltage of the first LC capacitor Clc1 for a predetermined period of time. The first common electrode Ec1 is connected to the upper common line VCL2 charged to the common voltage Vcom. The upper common line VCL2 is connected to the first and second lower common lines VCL1a and VCL1b through a contact hole (not shown) passing through the organic insulating layer PAC, the inorganic insulating layer PAS, and the gate insulating layer GI. Hence, the upper common line VCL2 receives the common voltage Vcom from the first and second lower common lines VCL1a and VCL1b.

The auxiliary display unit SP includes a second pixel electrode Ep2 and a second common electrode Ec2 which are positioned opposite each other and form a second LC capacitor Clc2. The second pixel electrode Ep2 is connected to the data line DL through a second TFT ST2. The second TFT ST2 is turned on in response to the scan pulse SCAN from the gate line GL, and thus the data voltage Vdata on the data line DL is applied to the second pixel electrode Ep2. A gate electrode of the second TFT ST2 is connected to the gate line GL, and a source electrode S2 of the second TFT ST2 is connected to the data line DL. A drain electrode D2 of the second TFT ST2 is connected to the second pixel electrode Ep2 through a second contact hole CH2 passing through the organic insulating layer PAC and the inorganic insulating layer PAS. The source electrode S2 of the second TFT ST2 is connected to the source electrode S1 of the first TFT ST1. The drain electrode D2 of the second TFT ST2 overlaps the discharge control line V3DL with the gate insulating layer GI interposed therebetween to form a second storage capacitor Cst2. The second storage capacitor Cst2 uniformly holds a charge voltage of the second LC capacitor Clc2 for a predetermined period of time. The second common electrode Ec2 is connected to the upper common line VCL2 charged to the common voltage Vcom.

The second pixel electrode Ep2 is connected to the upper common line VCL2 through the discharge control TFT DST. The discharge control TFT DST switches on or off a current path between the second pixel electrode Ep2 and the upper common line VCL2 in response to the discharge control voltage V3D. A gate electrode of the discharge control TFT DST is connected to the discharge control line V3DL, and a source electrode S3 of the discharge control TFT DST is connected to the second pixel electrode Ep2. A drain electrode D3 of the discharge control TFT DST is connected to the upper common line VCL2 through a third contact hole CH3 passing through the organic insulating layer PAC and the inorganic insulating layer PAS. The source electrode S3 of the discharge control TFT DST is connected to the drain electrode D2 of the second TFT ST2.

In the 2D mode, when the discharge control voltage V3D of the same level as the gate low voltage VGL is applied, the discharge control TFT DST completely closes a source-drain channel of the discharge control TFT DST and cuts off the current path between the second pixel electrode Ep2 and the upper common line VCL2. In the 3D mode, when the discharge control voltage V3D of the slight-on level SOL is applied, the discharge control TFT DST partially opens the source-drain channel of the discharge control TFT DST and partially allows the current path between the second pixel electrode Ep2 and the upper common line VCL2.

The discharge control TFT DST may be designed, so that it has the same channel capacitance as the first and second TFTs ST1 and ST2. The discharge control TFT DST is turned on due to the voltage of the slight-on level SOL lower than the full-on level by applying the discharge control voltage V3D of the slight-on level SOL lower than the gate high voltage VGH to the discharge control line V3DL. Even if the second TFT ST2 and the discharge control TFT DST are simultaneously turned on, an amount of current flowing through the discharge control TFT DST is less than an amount of current flowing through the second TFT ST2. Namely, a channel resistance of the discharge control TFT DST is greater than a channel resistance of the second TFT ST2 even if the second TFT ST2 and the discharge control TFT DST are simultaneously turned on. This is because the channel resistance of the TFT is inversely proportional to the voltage applied to the gate electrode of the TFT.

The gate line GL, the discharge control line V3DL, and the lower common lines VCL1a and VCL1b may be formed on the same level layer. Further, the first and second pixel electrodes Ep1 and Ep2, the first and second common electrodes Ec1 and Ec2, and the upper common line VCL2 may be formed on the same level layer.

An area of the line unit disposed between the main display unit MP and the auxiliary display unit SP has to decrease, so as to increase the aperture ratio of the pixel. The embodiment of the invention is configured, so that the line unit includes only the gate line GL and the discharge control line V3DL and the lower common lines VCL1a and VCL1b are formed to the outside of the pixel, thereby reducing the area of the line unit. In the line unit having the reduced area, the first and second TFTs ST1 and ST2 are formed on the gate line GL, and the first and second storage capacitors Cst1 and Cst2 and the discharge control TFT DST are formed on the discharge control line V3DL.

According to the above-described configuration of the stereoscopic image display, a second parasitic capacitance Cgs2 remaining in the auxiliary display unit SP is almost equal to a first parasitic capacitance Cgs1 remaining in the main display unit MP. The first parasitic capacitance Cgs1 is a capacitance generated between the drain electrode D1 of the first TFT ST1 and the gate line GL. The second parasitic capacitance Cgs2 is a capacitance generated between the drain electrode D2 of the second TFT ST2 and the gate line GL. As shown in FIG. 7, it is a matter of course that the second parasitic capacitance Cgs2 further includes a capacitance generated between the second pixel electrode Ep2 and the gate line GL. However, an amount of the capacitance is very small, and thus may be negligible. Because a distance between the second pixel electrode Ep2 and the gate line GL is much greater than a distance between the drain electrode D2 of the second TFT ST2 and the gate line GL, an amount of the capacitance between the second pixel electrode Ep2 and the gate line GL is very small and may be negligible. As described above, if the second parasitic capacitance Cgs2 is almost equal to the first parasitic capacitance Cgs1, the same charge characteristic between the main display unit MP and the auxiliary display unit SP may be secured.

If the aperture ratio increases because of a reduction in the area of the line unit, a capacitance of the second LC capacitor Clc2 of the auxiliary display unit SP may increase. Further, if the capacitance of the second LC capacitor Clc2 of the auxiliary display unit SP increases, the size of the second storage capacitor Cst2 of the auxiliary display unit SP may be reduced.

Figure 9:
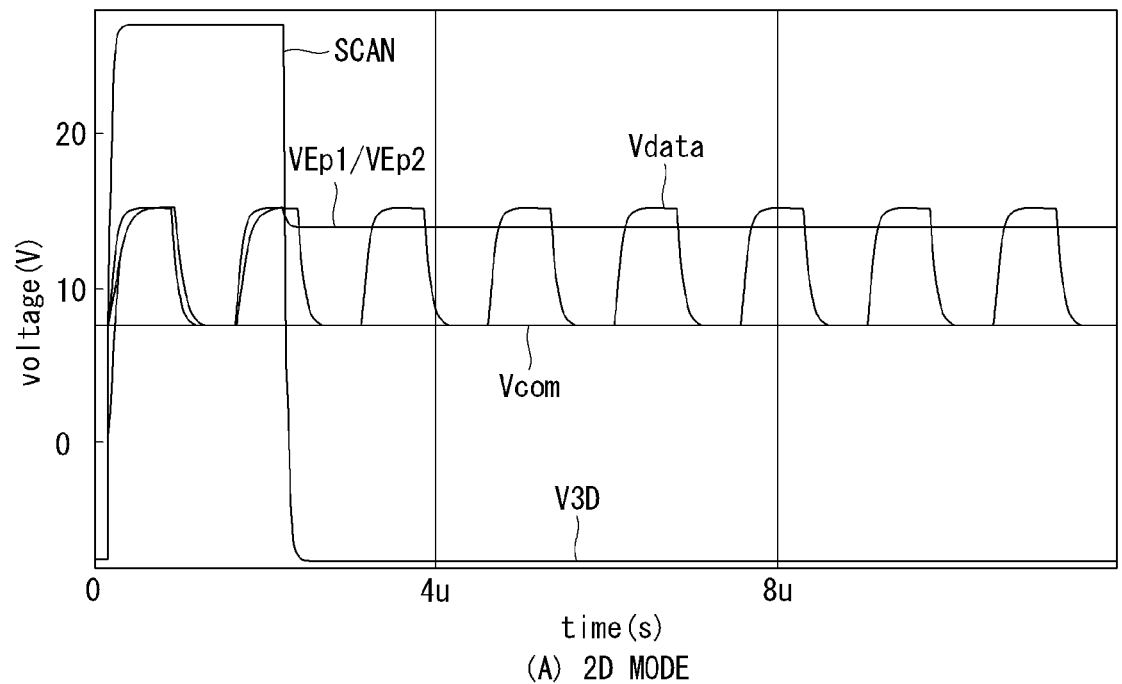
FIG. 9 illustrates charge and discharge waveforms of a pixel in each driving mode.
Figure 9:
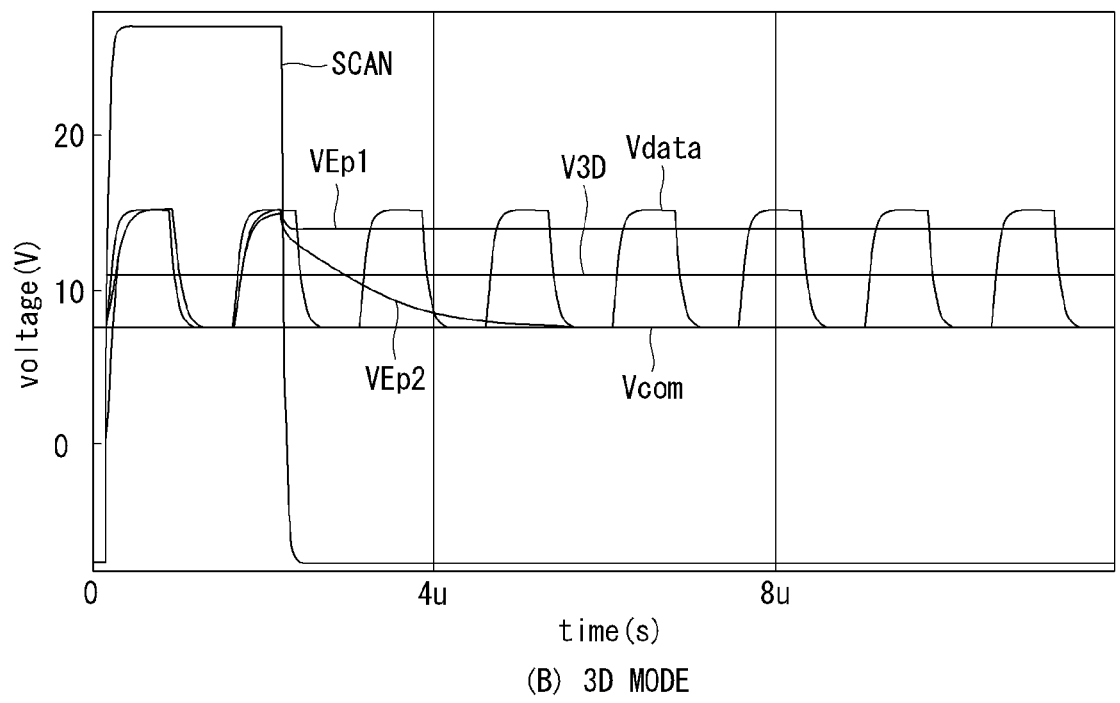
Figure 10:
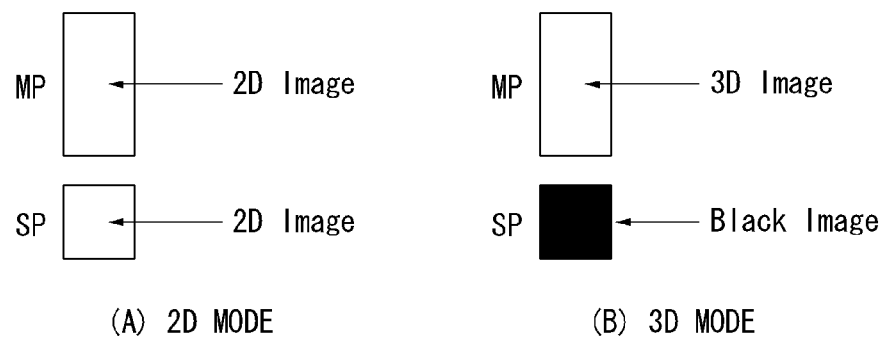
FIG. 10 illustrates a display image of a pixel in a 2D mode and a 3D mode.

FIG. 9 illustrates charge and discharge waveforms of the pixel having the configuration shown in FIGS. 6 to 8B in each driving mode.

An operation and an operational effect of the pixel PIX in each driving mode are described with reference to FIGS. 6 to 9.

First, an operation and an operational effect of the pixel PIX in the 2D mode are described below.

In the 2D mode, the discharge control voltage V3D may be generated at the same level as the gate low voltage VGL of the scan pulse SCAN. The discharge control TFT DST is continuously held in a turn-off state in response to the discharge control voltage V3D having the level of the gate low voltage VGL.

The first and second TFTs ST1 and ST2 are simultaneously turned on at the full-on level during a period (hereinafter referred to as a T1 period) in which the scan pulse SCAN is input at the gate high voltage VGH. The first pixel electrode Ep1 of the main display unit MP is charged to a first pixel voltage VEp1 as the data voltage Vdata for the display of the 2D image due to a turn-on operation of the first TFT ST1. The second pixel electrode Ep2 of the auxiliary display unit SP is charged to a second pixel voltage VEp2 as the data voltage Vdata for the display of the 2D image due to a turn-on operation of the second TFT ST2.

The first and second TFTs ST1 and ST2 are simultaneously turned off during a period (hereinafter referred to as a T2 period) in which the scan pulse SCAN is input at the gate low voltage VGL. When the first TFT ST1 is turned off, the first pixel voltage VEp1, which has been charged to the first pixel electrode Ep1 of the main display unit MP, is shifted by a predetermined value because of an influence of a kickback voltage and then is held at a shifted value by the first storage capacitor Cst1. When the second TFT ST2 is turned off, the second pixel voltage VEp2, which has been charged to the second pixel electrode Ep2 of the auxiliary display unit SP, is shifted by a predetermined value because of the influence of the kickback voltage and then is held at a shifted value by the second storage capacitor Cst2.

During the T1 and T2 periods, the common voltage Vcom is applied to the first common electrode Ec1 of the main display unit MP and the second common electrode Ec2 of the auxiliary display unit SP through the upper common line VCL2. A difference between the first pixel voltage VEp and the common voltage Vcom may be held to be substantially equal to a difference between the second pixel voltage VEp2 and the common voltage Vcom. A transmittance of the liquid crystal cells is proportional to a voltage difference between the pixel electrode and the common electrode in a normally black liquid crystal mode. As a result, as shown in (A) of FIG. 10, the main display unit MP and the auxiliary display unit SP display the 2D image of the same gray level. The 2D image displayed on the auxiliary display unit SP functions to increase the luminance of the 2D image.

Next, an operation and an operational effect of the pixel PIX in the 3D mode are described.

In the 3D mode, the discharge control voltage V3D may be generated at the slight-on level SOL. The discharge control TFT DST is continuously held in a slight-on state in response to the discharge control voltage V3D of the slight-on level SOL.

During the T1 period, the first and second TFTs ST1 and ST2 are simultaneously turned on at the full-on level in response to the scan pulse SCAN of the gate high voltage VGH. The first pixel electrode Ep1 of the main display unit MP is charged to the first pixel voltage VEp1 as the data voltage Vdata for the display of the 3D image due to the turn-on operation of the first TFT ST1. The second pixel electrode Ep2 of the auxiliary display unit SP is charged to the second pixel voltage VEp2 as the data voltage Vdata for the display of the 3D image due to the turn-on operation of the second TFT ST2. During the T1 period, a channel resistance of the discharge control TFT DST having the on-state of the slight-on level is much greater than a channel resistance of the second TFT ST2 having the on-state of the full-on level. Hence, a discharge current drained from the second pixel electrode Ep2 is much less than a charge current entering into the second pixel electrode Ep2. As a result, during the T1 period, the discharge control TFT DST having the ON-state of the slight-on level hardly affects the charge characteristic of the second pixel voltage VEp2.

During the T2 period, the first and second TFTs ST1 and ST2 are simultaneously turned off in response to the scan pulse SCAN of the gate low voltage VGL. When the first TFT ST1 is turned off, the first pixel voltage VEp1, which has been charged to the first pixel electrode Ep1 of the main display unit MP, is shifted by a predetermined value because of the influence of the kickback voltage and then is held at a shifted value by the first storage capacitor Cst1. When the second TFT ST2 is turned off, the second pixel voltage VEp2, which has been charged to the second pixel electrode Ep2 of the auxiliary display unit SP, is discharged to the level of the common voltage Vcom for a predetermined period of time because of the discharge current drained via the discharge control TFT DST. A channel resistance of the discharge control TFT DST having the on-state of the slight-on level is much less than a channel resistance of the second TFT ST2 having the off-state. As a result, the second pixel voltage VEp2, which has been charged to the second pixel electrode Ep2 of the auxiliary display unit SP through the discharge control TFT DST, is gradually discharged to the level of the common voltage Vcom without the influence of the kickback voltage.

Unlike the difference between the first pixel voltage VEp1 and the common voltage Vcom, a difference between the second pixel voltage VEp2 and the common voltage Vcom becomes substantially zero at a time when the discharge of the second pixel electrode Ep2 is completed. As a result, as shown in (B) of FIG. 10, according to the voltage difference-transmittance characteristic in the normally black liquid crystal mode, the main display unit MP displays the 3D image of a predetermined gray level and the auxiliary display unit SP displays an image of a black gray level. Thus, the auxiliary display unit SP serves as the active black stripe. The black image displayed on the auxiliary display unit SP increases a display distance between the 3D images (i.e., between the left eye image and the right eye image), which are adjacent to each other in a vertical direction. Hence, the vertical viewing angle of the 3D image, at which a crosstalk is not generated, may be widely secured using the black image of the auxiliary display unit SP without a separate black stripe pattern.

As described above, the stereoscopic image display according to the embodiment of the invention divides each of the pixels into the main display unit and the auxiliary display unit, assigns one gate line to each pixel, and simultaneously controls the discharge control TFTs of the auxiliary display units using the discharge control voltage. The stereoscopic image display according to the embodiment of the invention turns off the discharge control TFT in the 2D mode to thereby display the same 2D image on the main display unit and the auxiliary display unit, and slights on the discharge control TFT in the 3D mode to thereby use the auxiliary display unit as the active black stripe. Hence, the stereoscopic image display according to the embodiment of the invention can improve the luminance of the 2D image and the vertical viewing angle of the 3D image without an increase in the number of gate lines.

Furthermore, the embodiment of the invention forms only the gate line and the discharge control line in the line unit disposed between the main display unit and the auxiliary display unit and forms the lower common lines to the outside of the pixel, thereby reducing the area of the line unit. In the line unit having the reduced area, the first and second TFTs are formed on the gate line, and the first and second storage capacitors and the discharge control TFT are formed on the discharge control line. Hence, because the parasitic capacitance remaining in the main display unit and the parasitic capacitance remaining in the auxiliary display unit may be adjusted at the almost same level, the same charge characteristic between the main display unit and the auxiliary display unit may be secured. Further, because the aperture ratio of the pixel may increase, the size of the second storage capacitor of the auxiliary display unit may be reduced.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
    a display panel configured to selectively display a 2D image and a 3D image, the display panel including a plurality of pixels; and
    a patterned retarder configured to divide light from the display panel into first polarized light and second polarized light,
    wherein each of the plurality of pixels includes:
    a main display unit including a first pixel electrode connected to a data line through a first thin film transistor (TFT) and a first common electrode which is opposite to the first pixel electrode and is connected to an upper common line;
    an auxiliary display unit including a second pixel electrode, which is connected to the data line through a second TFT and is connected to the upper common line through a discharge control TFT, and a second common electrode which is opposite to the second pixel electrode and is connected to the upper common line; and a line unit disposed between the main display unit and the auxiliary display unit, the line unit including a gate line, through which a scan pulse is commonly applied to the first TFT and the second TFT, and a discharge control line, through which a discharge control voltage is applied to the discharge control TFT, wherein a lower common line, through which a common voltage is applied to the upper common line, is formed to the outside of the main display unit and the auxiliary display unit, wherein the first TFT and the second TFT are formed on the gate line, and wherein a first storage capacitor of the main display unit, a second storage capacitor of the auxiliary display unit, and the discharge control TFT are formed on the discharge control line.

2. The stereoscopic image display of claim 1, wherein the lower common line includes:

a first lower common line which is opened toward the line unit while surrounding the outside of the main display unit; and a second lower common line which is opened toward the line unit while surrounding the outside of the auxiliary display unit.

3. The stereoscopic image display of claim 1, wherein the first storage capacitor is formed by a drain electrode of the first TFT and the discharge control line which overlap each other with a gate insulating layer interposed therebetween, wherein the second storage capacitor is formed by a drain electrode of the second TFT and the discharge control line which overlap each other with the gate insulating layer interposed therebetween.

4. The stereoscopic image display of claim 1, wherein when the 2D image is implemented, the discharge control voltage of the same level as a gate low voltage of the scan pulse is commonly applied to the discharge control TFTs of the plurality of pixels, wherein when the 3D image is implemented, the discharge control voltage of a slight-on level, which is higher than the gate low voltage and is lower than a gate high voltage of the scan pulse, is commonly applied to the discharge control TFTs of the plurality of pixels.

5. The stereoscopic image display of claim 1, wherein the gate line and the discharge control line of the line unit are formed on the same level layer as the lower common line and cross between the main display unit and the auxiliary display unit to be positioned parallel to each other.

* * * * *